Oct. 12, 1926. 1,603,053
A. O. LEFFLER
INSECT CATCHING DEVICE
Filed Feb. 13, 1924
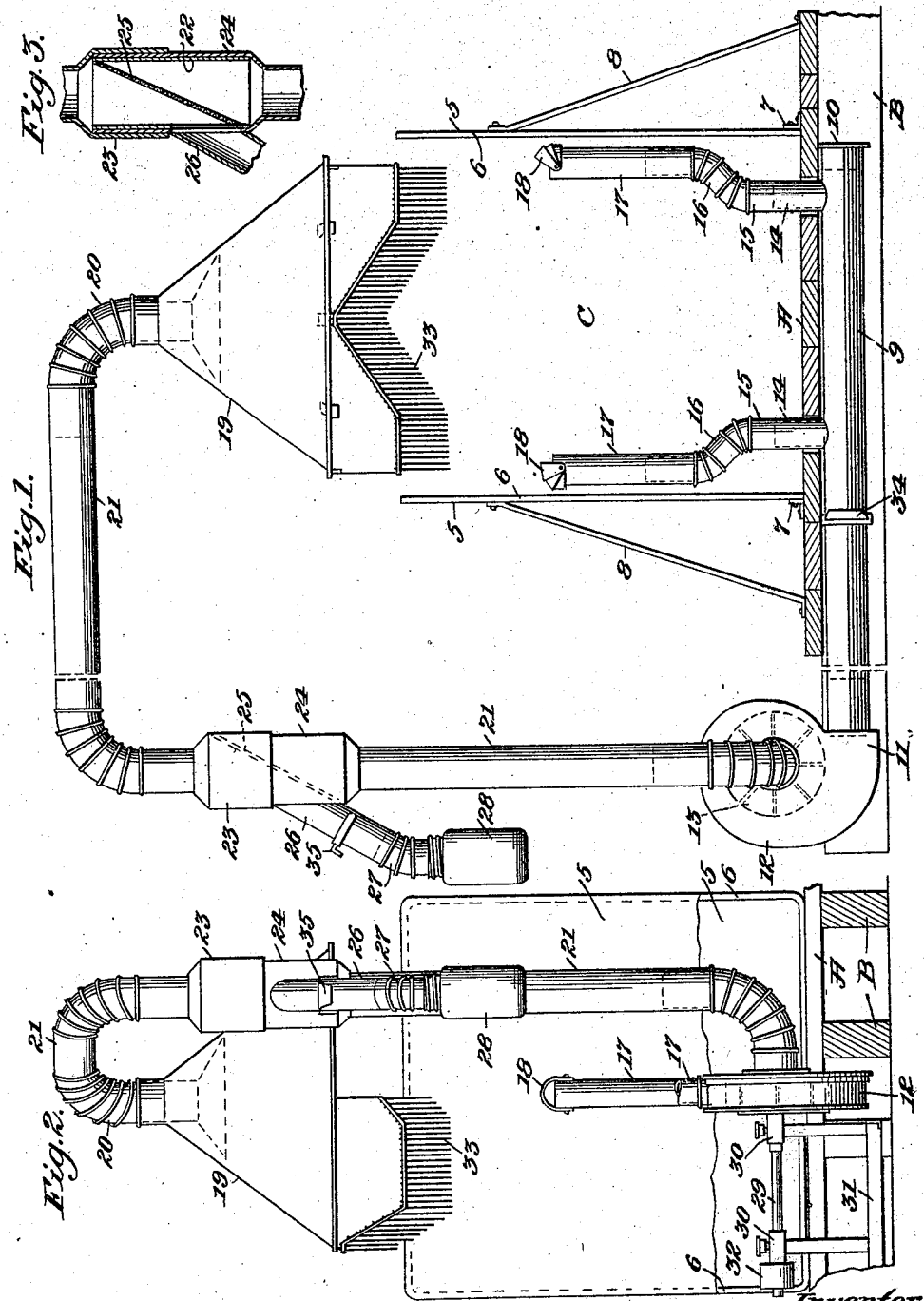
Inventor:
Arthur O. Leffler
Atty Patented Oct. 12, 1926.

1,603,053

UNITED STATES PATENT OFFICE.

ARTHUR O. LEFFLER, OF STAYTON, OREGON.

INSECT-CATCHING DEVICE.

Application filed February 13, 1924. Serial No. 692,510.

This invention relates to a fly catcher, and more particularly to that class of devices for use in removing and trapping flies and insects from the bodies of domestic animals, such as cattle, horses, sheep or the like.

The primary object of the invention is the provision of a device of this character, wherein the animal can be driven or lead into a stall or other partial enclosure, so that forced air can be directed upon it, for the removal of flies and insects, which latter will be trapped by a suction of air into a funnel disposed over the body of said animal, and conveyed therefrom into a depository or receiver, the same being removable from the device, so that the flies or insects therein can be dumped therefrom and exterminated.

Another object of the invention is the provision of a device of this character, wherein the construction thereof is novel in form, to assure the positive and effective working of the same.

A further object of the invention is the provision of a device of this character, which is extremely simple in construction, thoroughly reliable and efficient in operation, strong, durable, possessing but few parts, and inexpensive to manufacture and install.

With these and other objects in view the invention consists in the features of construction, combination and arrangement of parts as will be hereinafter fully described, illustrated in the accompanying drawings, and pointed out in the claim hereunto appended.

In the accompanying drawings:

Figure 1 is a side elevation of the device constructed in accordance with the invention.

Figure 2 is an end elevation thereof partly in section, and a portion of one side partition partly broken away.

Figure 3 is a fragmentary vertical sectional elevation through the trap joint of the suction conduit.

Similar reference characters indicate corresponding parts throughout the several views in the drawings.

Referring to the drawings, in detail, A, designates generally a foundation, of the wood floor type, although it may be of any other style, and is supported upon base sills B, spaced any desirable distance from each other, while rising from the foundation are spaced side partitions 5, each preferably made from sheet metal, having a reinforced rolled edge 6, to give strength and rigidity thereto. The bottom edge of each partition 5, is suitably secured to an angle cleat 7, which is secured to the foundation. Also these side partitions 5, have connected thereto at their outer sides braces 8, which likewise are fastened to the foundation, and the space between said partitions constitutes a stall for animals, the stall being designated generally at C, the animal being driven or lead therein in any suitable manner.

Located beneath the foundation A, and between a pair of the sills B, is an air conduit 9, having one end sealed at 10, and its opposite end connected with a nipple 11, extending tangentially from a fan casing 12, housing therein a fan 13, of the center suction and peripheral blast type. The conduit 9, has rising therefrom through suitable openings in the foundation A, nipples 14, on which are fitted spouts 15, adapted for free turning movement thereon, and these spouts are provided with elbows 16, carrying extensible pipe sections 17.

On the upper open ends of the pipe sections 17, are adjustable caps 18, for directing air currents emitted therefrom onto the body of the animal when standing in the stall C, so as to drive flies or insects off of the animal, and such flies or insects dislodged will be caught and trapped in a manner presently described. It will be apparent that the height of the pipe sections 17, can be varied accordingly to the size of the animal within the stall by the adjustment of said sections. Also these pipe sections 17, can be turned to position the caps 18, to direct the air currents to the desired points on the animal's body.

At a suitable height relative to the stall and adapted to overhang an animal standing therein is a substantially cone-shaped hood or funnel 19, the smaller open end of which is suitably connected with an elbow 20, of a suction conduit or pipe 21, the same leading to the central portion of the fan casing 12, for communication with the fan 13, therein, so that when the latter is operating a suction will be created in the conduit or pipe 21, and the flies or insects dislodged from the animal will be drawn into the hood or funnel 19, and conveyed through the conduit or pipe 21, to a receiver or container 22, removably held in a square drum formed by interfitted shells 23 and 24, respectively, on the adjacent ends of the sections constituting the conduit or pipe 21.

Arranged in the container 22, is a wire screen 25, disposed therein at an angle to deflect flies or insects received therein into a branch pipe 26, having an elbow 27, fitted with a removable jar 28, for receiving the flies or insects and constituting a depository therefor. On removal of the jar 28, the contents can be dumped therefrom for exterminating the same.

The main drive shaft 29, of the fan 13, is journaled in suitable bearings 30, mounted on a cross strut 31, carried by certain of the sills B, supporting the foundation A, and this shaft is fitted with a belt pulley 32, so that the fan can be driven from any suitable source of power.

Depending from the rim of the hood or funnel 19, is a fringe 33, so as to assure against the possibility of the escape of the flies or insects when driven from the animal in the stall C, by the forced air delivered from the pipe sections 17.

Arranged within the conduit 9, is a slide gate 34, constituting a valve for regulating the current of forced air therein, and also to enable the same to be shut off when desired. Likewise arranged in the branch pipe 26, is a slide gate 35, forming a valve therefor, so that this pipe can be closed to avoid any rupture in the suction conduit 21, when the jar 28, is removed for emptying the same of the flies and insects trapped therein.

What is claimed is:—

The combination of a hood adapted to be positioned above an animal stall, a pair of spaced rotatable and vertically adjustable spouts adapted to be arranged within the stall opposite each other below the hood, a combined air blast and suction element, air delivery and suction conduits leading from the element to the spouts and hood, respectively, and adjustable caps on upper free ends of the spouts.

In testimony whereof I affix my signature.

ARTHUR O. LEFFLER.